United States Patent [19]
Yoshino

[11] Patent Number: 5,592,230
[45] Date of Patent: Jan. 7, 1997

[54] HIGH DEFINITION TELEVISION RECEIVER

[75] Inventor: Akio Yoshino, Noda, Japan

[73] Assignee: Victor Company of Japan, Ltd., Kanagawa-ken, Japan

[21] Appl. No.: 561,383

[22] Filed: Nov. 21, 1995

[30] Foreign Application Priority Data

Nov. 22, 1994 [JP] Japan .................................. 6-312594

[51] Int. Cl.⁶ .................................................. H04N 7/01
[52] U.S. Cl. ............................................ 348/448; 348/458
[58] Field of Search .................................... 348/448, 458, 348/446, 445, 564, 447, 910, 911, 555, 556; 315/391, 395, 399; H04N 7/01, 11/20

[56] References Cited

U.S. PATENT DOCUMENTS

| | | |
|---|---|---|
| 4,414,571 | 11/1983 | Kureha et al. . |
| 4,426,661 | 1/1984 | Okada et al. ............................ 348/448 |
| 4,451,848 | 5/1984 | Okada et al. ............................ 348/448 |

FOREIGN PATENT DOCUMENTS

| | | |
|---|---|---|
| 0592038A1 | 4/1994 | European Pat. Off. . |
| 56-655727 | 6/1981 | Japan . |
| 59-65066 | 4/1982 | Japan . |
| 61-225978 | 10/1986 | Japan . |
| 3-113977 | 5/1991 | Japan . |
| 2161346 | 7/1984 | United Kingdom . |

*Primary Examiner*—Michael H. Lee
*Attorney, Agent, or Firm*—Michael N. Meller

[57] ABSTRACT

A compact and low cost HDTV receiver is capable of reproducing both an NTSC signal and an HDTV signal. The HDTV signal has a horizontal deflection frequency about twice that of the NTSC signal. The HDTV received includes a construction of a double speed NTSC signal processing portion in the receiver in which a pair of velocity modulation coils 13a and a pair of auxiliary vertical deflection coils 13b are provided on a common bobbin such that the coil pairs are arranged orthogonally to each other.

2 Claims, 5 Drawing Sheets

ODD FIELD        EVEN FIELD

ODD FIELD        EVEN FIELD

ODD FIELD        EVEN FIELD

HIGH DEFINITION TELEVISION RECEIVER

BACKGROUND OF THE INVENTION

1. Field of the Invention:

TABLE

|  | CLEARVISION SYSTEM | DOUBLE SPEED FIELD PROCESS SYSTEM | HORIZONTAL DEF. FREQUENCY SWITCHING SYSTEM | HI-VISION SIGNAL |
| --- | --- | --- | --- | --- |
| fh (HORIZONTAL DEF. FREQUENCY) [khz] | 31.5 | 31.5 | 15.75 | 33.75 |
| fv (VERTACAL DEF. FREQUENCY) [Hz] | 60 | 120 | 60 | 60 |
| INTERLACE/ NON-INTERLACE | NON-INTERLACE | INTERLACE | INTERLACE | INTERLACE |
| SIGNAL INTERPOLATION | APPLIED | NOT APPLIED | NOT APPLIED | |

The present invention relates to a high definition television (HDTV) receiver capable of displaying both a current standard color television signal (NTSC, PAL, SECAM etc.) and a high definition television signal having a horizontal deflection frequency about twice that of the current standard color television signal. Particularly, the present invention is intended to provide an HDTV receiver including a double speed processing portion for processing the current standard color television signal at a double speed, a circuit arrangement and construction of which are improved such that the HDTV receiver becomes compact and low cost and can prevent an image quality from being degraded when a double speed conversion is performed for the current standard color television signal.

In this description, the NTSC system will be described as a typical example of the current standard color television system.

2. Description of Prior Art:

Recently, programs of HDTV System, called "Hi-Vision" system in Japan, and of ADTV (Advanced Television) system, called "Clearvision" in Japan, are distributed through a broadcasting or in a packaged media and becoming popular. Compared to current TV broadcasting systems such as the NTSC system, the HDTV or ADTV system presents much higher picture quality. Among those high picture quality broadcasts, the MUSE system belongs to the HDTV system and the first and second generation Extended Television (EDTV) systems belong to the ADTV system.

Vertical deflection frequencies of the Hi-Vision system, the Clearvision system and the NTSC system are substantially the same. However, the horizontal deflection frequency of the Hi-Vision system as well as the Clearvision system is about twice that of the NTSC system. That is, the number of scanning lines of the Hi-Vision system or the Clearvision system is about twice that of the NTSC system. An NTSC signal processing in a HDTV receiver capable of displaying both the HDTV signal and the NTSC signal is performed according to one of the following three systems:

(1) Clearvision system,
(2) Double speed field processing system,
(3) Horizontal deflection frequency switching system.

The difference between these three signal processing systems and the HDTV signal configuration are shown in the Table which will follow and FIGS. 5(a) to 5(c).

As shown in FIG. 5(c), the Clearvision system is a double density, non-interlace system and scanning line signals 1' and 2' are generated by interpolation. That is, the scanning line signals 1' and 2' are generated by adaptively switching an operation of the HDTV receiver between an intra-field processing and an inter-field processing depending on the kind of picture detected, that is, a moving picture or a still picture.

In the double speed field processing system, horizontal and vertical scans are performed by electron beam deflected at a double speed as shown by solid lines in FIG. 5(b), respectively. Same lines in a first field are scanned twice with an interval of 1/120 seconds and a second field is interlaced and same lines thereof are scanned twice similarly.

In the horizontal deflection frequency switching system, the horizontal deflection frequency is switched to 15.75 kHz of the NTSC system to perform an interlace scanning of the normal NTSC system as shown by solid lines in FIG. 5(a).

In the Clearvision system or the double speed field processing system, the horizontal deflection frequency fh for the NTSC signal processing is 31.5 kHz which is twice the horizontal deflection frequency of the NTSC system and is close to the horizontal deflection frequency ranged from 31.5 to 33.75 kHz of the HDTV signal. Therefore, it is possible that the HDTV signal processing circuit and the NTSC signal processing circuit can commonly use a horizontal deflection circuit and a high voltage generating circuit advantageously. However, the Clearvision system requires a frame memory for producing the interpolation signals, which means an increase of cost, and there may be an unnatural movement of a picture at every switching from a moving picture to a still picture, which means a degradation of image quality.

On the other hand, the double speed field processing system requires a field memory and a switching device for switching a vertical deflection frequency between 120 Hz and 60 Hz when the signal processing system is changed between the NTSC signal processing and the Clearvision signal processing, causing an increase of cost.

The horizontal deflection frequency switching system requires a circuit for substantially switching of the horizontal deflection circuit and the high voltage generating circuit since the horizontal deflection frequency in the Clearvision signal processing is about twice that in the NTSC signal processing, which leads to increase of cost and increase of size of the receiver.

SUMMARY OF THE INVENTION

An object of the present invention is to provide an HDTV receiver which is compact and low in cost and can prevent an image quality from being degraded when a double speed conversion is performed, by employing a rational circuit arrangement and construction for a double speed NTSC signal processing, particularly for an auxiliary vertical deflection coil of the HDTV receiver.

In order to achieve the above object, according to the present invention, an HDTV receiver for displaying an image of a current standard color television signal and an image of an HDTV signal having a horizontal deflection frequency about twice that of the current standard color television signal on a screen of a cathode ray tube having a pair of velocity modulation coils mounted on a bobbin in a vertical deflecting direction, comprises a horizontal deflection circuit for performing a horizontal deflection at a frequency about twice a horizontal sync signal separated from the current standard color television signal during a reproduction of the current standard color television signal, a double speed conversion circuit for time-compressing an input current standard color television signal to ½ during the reproduction of the current standard color television signal and supplying a signal of two lines having same content as that of a signal off one line prior to the time-compression to said cathode ray tube and an auxiliary vertical deflection circuit for driving a pair of auxiliary vertical deflection coils for controlling a vertical deflection of electron beam such that the two lines having the same content are superposed each other to appear as one line during the reproduction of the current standard color television signal, wherein the auxiliary vertical deflection coils are arranged on a space of the bobbin in substantially the horizontal deflecting direction orthogonal to the velocity modulation coils.

DETAILED DESCRIPTION OF THE PREFERRED EMBODIMENT

Figure 1:
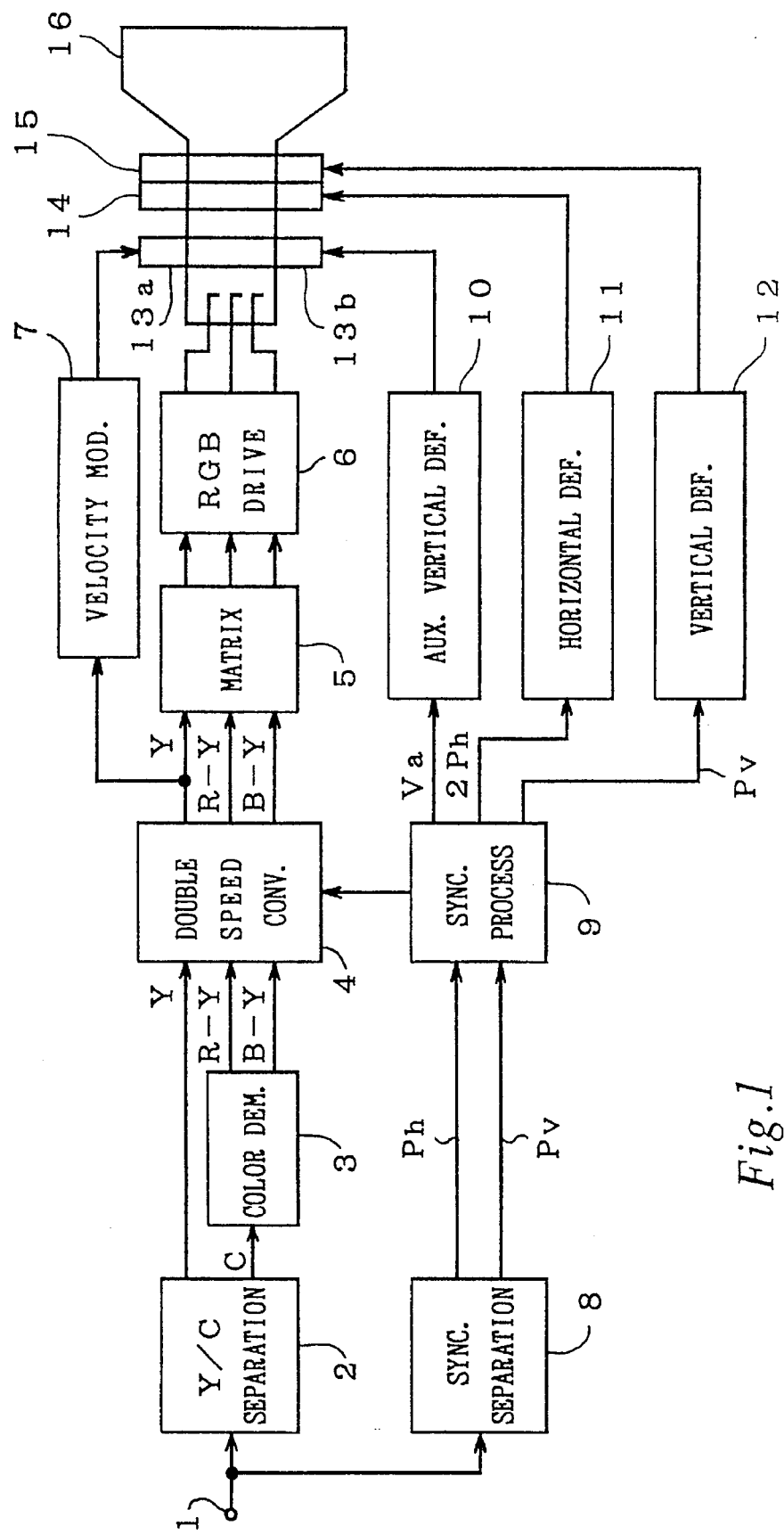
FIG. 1 is a block diagram of an HDTV receiver according to an embodiment of the present invention.

A block circuit diagram of an embodiment of the present invention is shown in FIG. 1. An operation of this embodiment when an NTSC signal as a current standard color television signal is inputted, will be described in detail without description of operation when an HDTV signal is inputted since the latter operation is the same as that of a conventional HDTV receiver.

The NTSC signal is supplied from an input terminal 1 and Y(luminance signal), R-Y and B-Y signals (color difference signals) of the NTSC signal are obtained through a Y/C separator circuit 2 and a color demodulator circuit 3. The Y, R-Y and B-Y signals thus obtained are supplied to a double speed conversion circuit 4, in which the double speed converted Y, R-Y and B-Y signals are further converted into double speed R, G and B signals by a matrix circuit 5 and are supplied to a cathode of a cathode ray tube (CRT) 16 through an RGB drive circuit 6.

On the other hand, the NTSC signal supplied from the input terminal 1 is also supplied to a sync signal separation circuit 8 from which a horizontal sync signal Ph and a vertical sync signal Pv are outputted. The horizontal sync signal Ph is doubled in a sync processing circuit 9 and supplied to a horizontal deflection circuit 11. The horizontal deflection circuit 11 supplies a horizontal deflection current having a frequency (31.5 kHz) twice that of the NTSC signal to a horizontal deflection coil 14 to cause a double speed horizontal deflecting operation.

The vertical sync signal Pv from the sync separation circuit 8 passes through the sync processing circuit 9 as it is and supplied to a vertical deflection circuit 12. The vertical deflection circuit 12 drives a vertical deflection coil 15 at a vertical deflection frequency of the NTSC system to perform a vertical deflecting operation.

A velocity modulation circuit 7 receives the Y signal from the double speed conversion circuit 4 and drives a pair of velocity modulation coils 13a to modulate a horizontal deflection speed of electron beam of the CRT 16 with the Y signal, this enhances a reproduced picture quality.

The operation of the velocity modulation coils 13a is the same as that of a conventional coils except that the operation speed is twice much.

Now, the double speed conversion circuit 4, the sync processing circuit 9 and the auxiliary vertical deflection circuit 10 will be described in more detail.

Figure 2A:
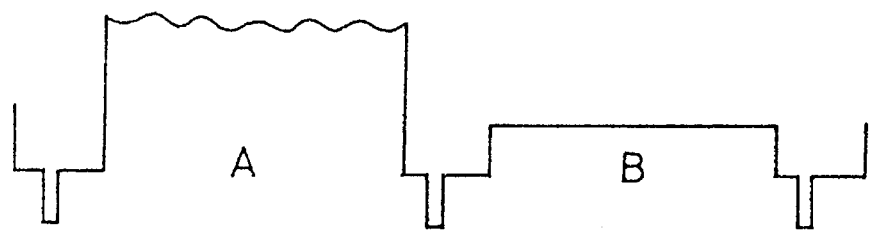
FIGS. 2(a), 2(b), 2(c), 2(d), 2(e) and 2(f) are shows signal waveforms at various portions of the HDTV receiver shown in FIG. 1.
Figure 2B:
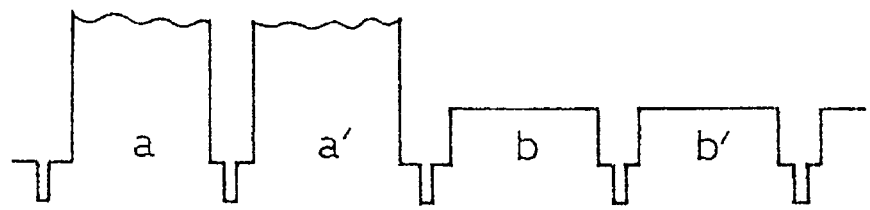
Figure 2C:

The double speed conversion circuit 4, is realized by using mainly memory devices, that is, in the double speed conversion circuit 4, the input Y signal (FIG. 2(a)) is written in a line memory (not shown) sequentially and read out a signal of the same horizontal scanning line twice at a speed twice the writing speed (FIG. 2(b)). That is, a signal of one horizontal scanning line written in the line memory as signal A is time-compressed to ½ and is read out twice as signals a and a' shown in FIG. 2(b). In other words, signals having the same content and corresponding to 2 scanning lines are read out. With this operation, the double speed conversion is performed. This double speed converting process is performed for the respective color difference signals R-Y and B-Y.

The sync processing circuit 9 produces the following signals on the basis of the horizontal sync signal Ph and the vertical sync signal Pv supplied thereto and supplies them to the respective circuits:

(1) Clock pulses for write and read control of the line memory in the double speed conversion circuit 4.

Figure 2D:

(2) Pulse 2Ph (FIG. 2(d)) having a frequency twice as much as that of the horizontal sync signal Ph, to be supplied to the horizontal deflection circuit 11 for the horizontal deflection.

(3) Pulse Pv for vertical deflection driving, to be supplied to the vertical deflection circuit 12.

Figure 2E:
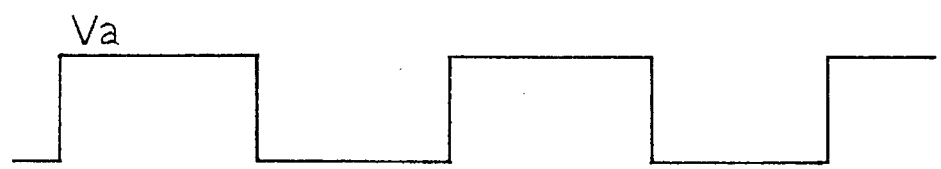

(4) Pulse Va for auxiliary vertical deflection to be supplied to the auxiliary vertical deflection circuit 10 (FIG. 2(e)).

Figure 2F:
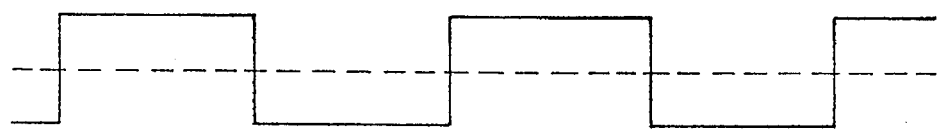
Figure 3:
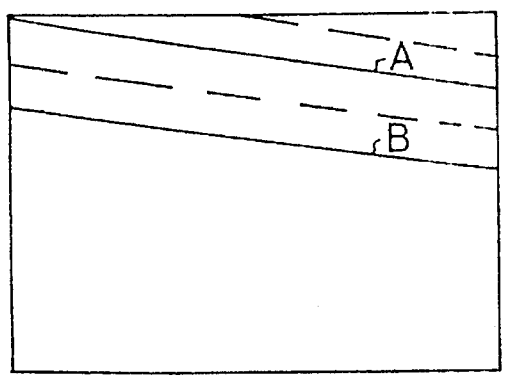
FIGS. 3(a) to 3(c) illustrate scanning line positions in the embodiment shown in FIG. 1.
Figure 3:
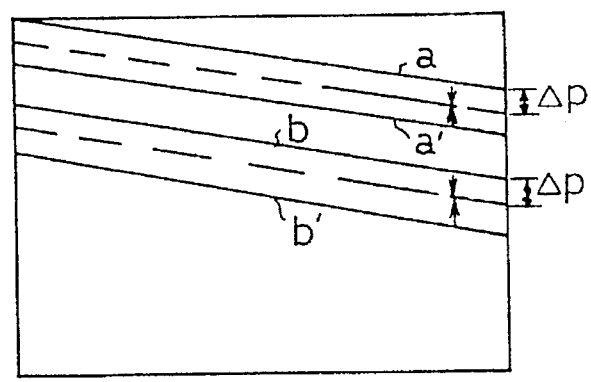
Figure 3:
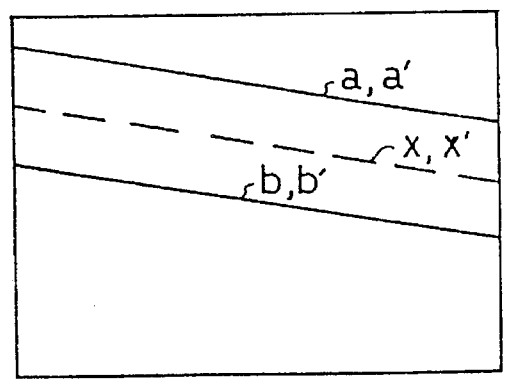

The auxiliary vertical deflection circuit 10 is supplied with the pulse Va from the sync processing circuit 9 and supplies a current shown in FIG. 2(f) to a pair of auxiliary vertical deflection coils 13b. The auxiliary vertical deflection coils 13b respond to a positive portion of the current shown in FIG. 2(f) to displace a scanning line position down by ΔP as shown in FIG. 3(b). The amount ΔP corresponds to a half of an interval between adjacent two horizontal scanning lines when the scan is performed responsive to the vertical deflection circuit 12. Further, the auxiliary vertical deflection coils 13b respond to a negative portion of the current shown in FIG. 2(f) to displace the scanning line position up by ΔP as shown in FIG. 3(b). The auxiliary vertical deflection circuit 10 may be constructed with a combination of a known flip-flop circuit and a known amplifier circuit.

The amount of the displacement depends upon a value of the auxiliary vertical deflection coil current. Therefore, the value of the auxiliary vertical deflection coil current is determined as such that the adjacent 2 scanning lines a and a' having the same content are overlapped in the same position, that is, such that the amount of displacement becomes ΔP.

FIG. 3(c) shows a state where adjacent 2 scanning lines having the same content are overlapped at the same position. In FIG. 3(e), scanning lines of the odd numbered field are shown by solid lines. The even numbered field is started at the 262.5th horizontal scanning line prior to the double speed conversion with a phase difference of (½)H with respect to the odd numbered field. Therefore, the scanning lines are overlapped at a position shown by dotted lines x and x' in FIG. 3(c). That is, the even number field and the odd number field include mutually and completely interlaced scanning lines. This scanning line structure is the same as that of the usual interlaced image (horizontal deflection frequency fh: 15.75 kHz, 525 scanning lines) of the NTSC system shown in FIG. 3(a). Therefore, the present invention according to this embodiment can provide visually the same image as the ordinary reproduced image of the NTSC system even when the NTSC signal is reproduced by double speed conversion of the horizontal deflection frequency, thus there is no visible disordered pictures presented to a viewer.

Now, a physical arrangement of the auxiliary vertical deflection coils 13b will be described. As shown by a solid arrow in FIG. 4(b), a pair of the velocity modulation coils 13a are arranged in a top and bottom relation in order to modulate the deflection velocity of the electron beam in the horizontally deflecting direction. On the other hand, the auxiliary vertical deflection coils 13b are required to be arranged in a side by side relation in order to deflect the electron beam vertically direction as shown by a solid arrow in FIG. 4(a). Accordingly, the velocity modulation coils 13a and the auxiliary vertical deflection coils 13b are arranged orthogonal to each other.

Figure 4:
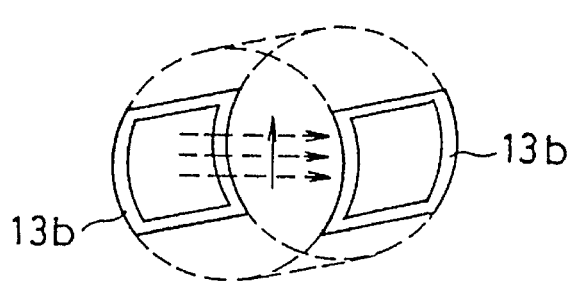
FIGS. 4(a) to 4(d) illustrate an arrangement of an auxiliary vertical deflection coil.
Figure 4:
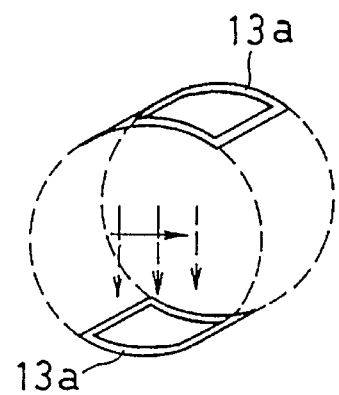
Figure 4:
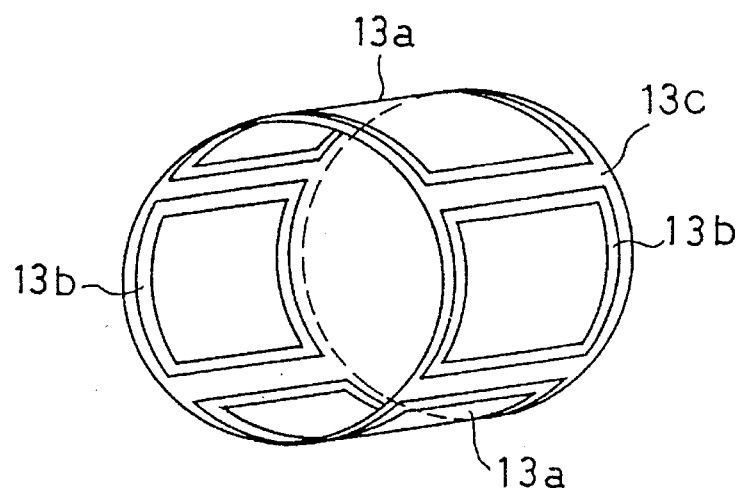
Figure 4:
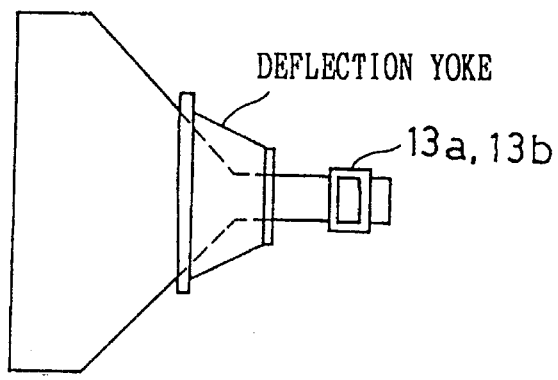
Figure 5A:
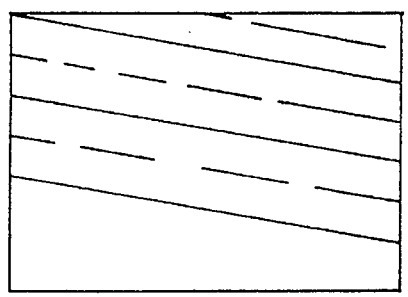
FIGS. 5(a) to 5(c) illustrate exemplary displayed pictures of prior arts.
Figure 5A:
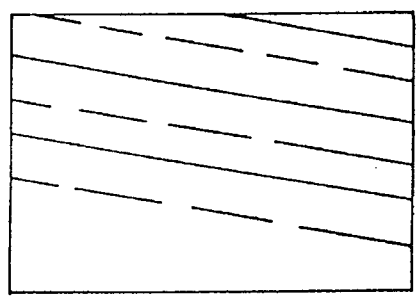
Figure 5B:
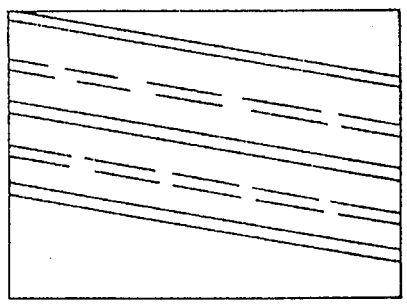
Figure 5B:
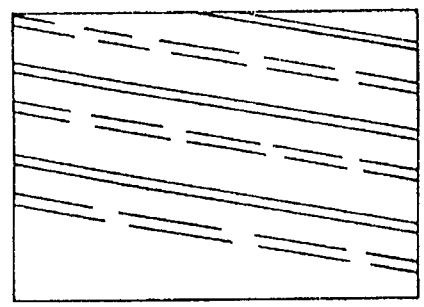
Figure 5C:
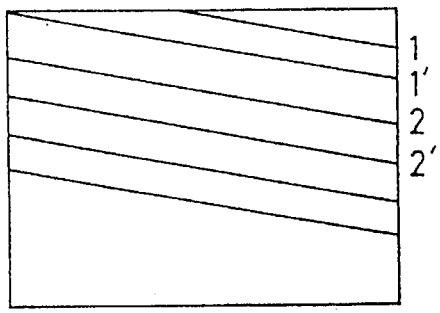
Figure 5C:
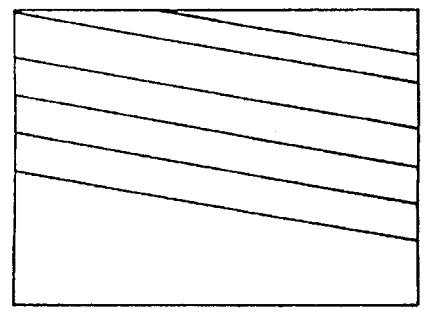

It is possible to wind the auxiliary vertical deflection coils 13b on a bobbin different from a bobbin 13c on which the velocity modulation coils are wound and to arrange the different bobbin on a neck portion our the CRT such that it becomes orthogonal to the velocity modulation coils. In such case, however, due to the use of the extra bobbin which requires an extra space, the size of the TV receiver would become large and its cost would be increased. In the embodiment of the present invention, the auxiliary vertical deflection coils 13b are arranged on a space of the bobbin on which the velocity modulation coils 13a are arranged, such that the coils 13b become orthogonal to the coils 13a, as shown in FIG. 4(c). The bobbin 13c on which the velocity modulation coils 13a and the auxiliary vertical deflection coils 13b are arranged is mounted on the neck portion of the CRT, as shown in FIG. 4(d).

During the HDTV signal processing, the operation of the auxiliary vertical deflection coils is stopped by cutting the current of the auxiliary vertical deflection coils shown in FIG. 2(f).

Since the velocity modulation coils 13a and the auxiliary vertical deflection coils 13b are arranged on the same bobbin, there is no need of preparing another bobbin for the auxiliary vertical deflection coils 13b and a space therefor, resulting in a compact and low cost TV receiver. Further, since, in this embodiment, time scanning line position is displaced forcibly by the auxiliary vertical deflection coils 13b, time interlace operation is stable.

Further in this embodiment, it is possible by doubling the horizontal deflection frequency to 31.5 kHz without changing the vertical deflection frequency in the NTSC signal reception, that the horizontal deflection frequency and the vertical deflection frequency can be kept substantially unchanged between the HDTV signal (Hi-Vision signal, Clearvision signal ) reception ( signal processing) and time NTSC signal reception ( signal processing) . Therefore, the horizontal deflection circuit and the high voltage generator circuit, etc., can be commonly used for the HDTV signal and the NTSC signal, which, together with the effect of the rational arrangement of the velocity modulation coils and the auxiliary vertical deflection coils, contributes to a miniaturization and cost reduction of the TV receiver.

Further, since the present invention does not use the interpolation signals as In the conventional Clearvision system, time degradation of image quality is avoided. Further, there is no need of providing a large capacity memory which is otherwise necessary in the double speed field processing system and a switching circuit for switching the vertical deflection frequency.

Although, in the above description, the NTSC signal is explained as the current standard color television system signal, the present invention can also be applied to an HDTV receiver which processes both the PAL (or SECAM) signal and the HDTV signal having a horizontal deflection frequency about twice that of the PAL (or SECAM) signal.

The advantages of the present invention are summarized as follows:

(a) The auxiliary vertical deflection coils which are necessary to reproduce the current standard color television signal without presenting disordered images to a viewer by making the horizontal deflection frequency about twice much (for example, 31.5 kHz), are arranged in substantially the horizontal direction on the same bobbin as that on which the velocity modulation coils are arranged. Therefore, there is no need of preparing an additional bobbin for the auxiliary vertical deflection coils and a space therefor, resulting in a compact and low cost TV receiver.

(b) Since the scanning line position is displaced forcibly by the provision of the auxiliary vertical deflection coils, the interlace operation is stable.

(c) It is possible to make the horizontal deflection frequency and the vertical deflection frequency in the HDTV signal (Hi-Vision signal, Clearvision signal) processing and the current standard color television signal (for example, the NTSC signal) processing substantially kept unchanged by doubling the horizontal deflection frequency to 31.5 kHz without changing the vertical deflection frequency during the reproduction of the NTSC signal. Therefore, the horizontal deflection circuit and the high voltage generator circuit, etc., can be commonly used for the HDTV signal (for example, Hi-Vision signal, Clearvision signal) and the current standard color television signal (for example, the NTSC signal), which contributes to a miniaturization and cost reduction of the TV receiver. Further, there is no need of providing the large capacity memory and the switching circuit for switching the vertical deflection frequency, thus the present invention is advantageous to reduce the size of the receiver and reduce the cost thereof.

(d) Since the present invention does not use the interpolation signals as in the conventional Clearvision system, the degradation of image quality is avoided.

What is claimed is:

1. A HDTV receiver for displaying an image of a current standard color television signal and an image of an HDTV signal having a horizontal deflection frequency about twice that of the current standard color television signal on a screen of a cathode ray tube having a pair of velocity modulation coils mounted on a bobbin arranged in a vertical deflecting direction of an electron beam of said cathode ray tube, comprising:

a horizontal deflection circuit for horizontally deflecting said electron beam at a frequency substantially twice a horizontal sync signal separated from the current standard color television signal during a reproduction of the current standard color television signal;

a double speed conversion circuit for time-compressing an input current standard color television signal to ½ during the reproduction of the current standard color television signal and supplying a signal of two scanning lines having a same content as that of a signal of one line prior to the time-compression to said cathode ray tube; and an auxiliary vertical deflection circuit for driving a pair of auxiliary vertical deflection coils at a line frequency of said current standard color television signal for controlling a vertical deflection of said electron beam such that said two scanning lines having the same content are superposed on each other to appear as one scanning line during the reproduction of the current standard color television signal, said pair of auxiliary vertical deflection coils being laid out in substantially a horizontal direction of said electron beam in a space of said bobbin.

2. An HDTV receiver as claimed in claim 1, wherein said pair of auxiliary vertical deflection coils oppose each other and are disposed between the pair of velocity modulation coils around said bobbin.

* * * * *